United States Patent [19]
Bessacini et al.

[11] Patent Number: 5,671,140
[45] Date of Patent: Sep. 23, 1997

[54] FUZZY CONTROLLER FOR TARGET INTERCEPT GUIDANCE

[75] Inventors: Anthony F. Bessacini, Narragansett; Robert F. Pinkos, Saunderstown, both of R.I.

[73] Assignee: The United States of America as represented by the Secretary of the Navy, Washington, D.C.

[21] Appl. No.: 498,812

[22] Filed: Jul. 6, 1995

[51] Int. Cl.⁶ .................................................. G06F 165/00
[52] U.S. Cl. ........................ 364/424.032; 364/423.098; 395/905; 244/3.13; 244/3.15
[58] Field of Search ............... 364/423.098, 424.027, 364/424.032, 462, 516; 395/3, 900, 905; 318/589; 244/3.1, 3.11, 3.13, 3.14, 3.15, 3.19

[56] References Cited

U.S. PATENT DOCUMENTS

| | | | |
|---|---|---|---|
| 4,732,349 | 3/1988 | Maurer | 244/3.13 |
| 5,080,300 | 1/1992 | Stubbs et al. | 244/3.14 |
| 5,101,351 | 3/1992 | Hattori | 395/905 |
| 5,118,050 | 6/1992 | Arnold et al. | 244/3.19 |
| 5,319,556 | 6/1994 | Bessacini | 364/424.02 |
| 5,429,322 | 7/1995 | Waymeyer | 244/3.15 |
| 5,436,832 | 7/1995 | Bessacini et al. | 364/424.02 |

*Primary Examiner*—Gary Chin
*Attorney, Agent, or Firm*—Michael J. McGowan; Prithvi C. Lall; Michael F. Oglo

[57] ABSTRACT

A target intercept guidance system for directing a steerable object, such as a torpedo. The guidance system senses the bearing and range between a first site and a second site and determines the position of the steerable object as it moves toward the second site. Two error functions are produced. The first error function represents the angle between the bearing from the steerable object to the second site and the course of the steerable object. The second error signal represents the rate of change of that angle. These error signals are classified into first and second sensed linguistic variables based upon membership functions from the first and second sensed variable membership function sets to become fuzzy inputs that produce fuzzy output control output membership functions from a control output membership function set based upon logical manipulation of the fuzzy inputs. These fuzzy control output membership functions are converted into an output having an appropriate form for control.

30 Claims, 12 Drawing Sheets

|  | $\Delta e_v$ | | | | | | |
|---|---|---|---|---|---|---|---|
|  | NL | NM | NS | ZE | PS | PM | PL |
| N | PL | PM | PS | ZE | NS | NM | NL |
| $e_v$  ZE | PL | PM | PS | ZE | NS | NM | NL |
| P | NL | NM | NS | ZE | PS | PM | PL |

FIG. 6

FUZZY CONTROLLER FOR TARGET INTERCEPT GUIDANCE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

This invention generally relates to a control system located at a first site for guiding a steerable object from that site toward a second site. More specifically this invention relates to such a control system that is operable even when both the first and second sites undergo independent motion.

2. Description of the Prior Art

Submarines include a control system for guiding a torpedo launched from the submarine toward a target. In this particular application, the torpedo constitutes a steerable object while the submarine and target constitute first and second sites, respectively, that are capable of undergoing independent motion. The control system that has been used in submarine applications is oftentimes a "corrected intercept" control system at the submarine, or first site, that guides a torpedo toward the target, as the second site, on a collision course with the second site.

Intercept control systems generally operate with steerable objects characterized by some internal homing or equivalent steering control system. In the case of a submarine launched torpedo, the corrected intercept control system directs a torpedo with an acoustic homing system toward the target. When the torpedo comes within the effective range of the homing system, the homing system takes over the steering control function.

Prior art corrected intercept control systems for submarine launched torpedoes include a control mechanism, a torpedo model and a communications link to the torpedo, as the steerable object. The torpedo model is a mathematical replica of the torpedo that provides position and status information for post launch guidance operation. The control mechanism utilizes measured contact information and torpedo model information to generate a command sequence for maintaining the torpedo on a collision trajectory with the target. These commands are transferred from the submarine to the torpedo through a wire communications link.

Whereas prior art corrected intercept control systems required a complete target state vector, the system disclosed herein operates with only measured range and bearing.

These prior art correct intercept control systems have required a complete target state vector and have not included any mechanism for readily allowing the inclusion of heuristic information into the control system, particularly information about expertise gained through past experience with manual intercept guidance systems. Also the prior art intercept control systems normally require an operator to determine whether to issue a particular command to a torpedo. Present systems do not automatically generate and issue guidance commands in a continuous fashion.

Other approaches for directing a steerable object from a launch site to a target involve complicated control systems based on sets of differential equations and estimates of input parameters. Such systems operate in response to analytical controllers. However, like prior art intercept control systems such analytical controllers are not readily adapted to utilize expert knowledge gained through experience.

In recent years another approach to controlling the operation of various devices has evolved. This approach now is generally known as fuzzy control. In broad terms, and as described in U.S. Letters Pat. No. 4,860,213 to Bonissone, an automated rule-based reasoning with uncertainty system has a three layer structure composed of representation, inference and control layers. Rule firings and conclusions are computed in the inference layer in a manner to propagate uncertainty information through the system in accordance with predetermined formulas designated by the control layer. Rule structures and conclusions and uncertainty information associated therewith are represented to the user in the representation layer.

U.S. Letters Pat. No. 5,101,351 to Hattori depicts one such fuzzy control system for steering a vehicle. In this system a camera forms an image of the road. An image processor uses the image to calculate the deviation between a plurality of reference points on a road and the direction in which the vehicle is traveling. Each reference point is associated with a plurality of visual points spaced along the road at predetermined distances ahead of the vehicle. The control determines the product of the deviation for each visual point and a membership function indicating the degree of importance attached to each visual point. The membership functions are varied in accordance with the time rate of change of the deviations. The control also calculates a total deviation equal to the sum of the products, and this total deviation is the basis for steering control.

U.S. Letters Pat. No. 5,122,957 to Hattori discloses an autonomous vehicle for automatically and autonomously running on route of travel under a fuzzy controller. The fuzzy controller operates by using a plurality of control rules defining predetermined steering controlled variables according to magnitude classifications of previously classified deviations on steering operations and membership functions indicating certainties corresponding to respective classifications of actual deviations (offset), the certainties corresponding to each magnitude classification are correlated to the control rules to determine the steering controlled variable. In the autonomously running vehicle, the running scenes of the vehicle are automatically detected on the basis of the image data derived by an image processing unit. Reference membership functions are varied according to any one of the running scenes so that the membership functions are automatically set according to the running scenes. Control rules are previously set only to the reference membership functions. Hence, setting operations of control rules and membership functions through simulations may be carried out only for the reference membership functions.

U.S. Letters Pat. No. 5,189,619 to Adachi et al. discloses a system for controlling the speed of a vehicle in accordance with the driving characteristics of the driver. In effecting the follow-up driving which corresponds to the driving characteristics of the driver, the vehicle and the vehicle in front, the relative speed, the relative position and the running state such as the speed and the steering angle of the vehicle itself are detected. A danger index is calculated from the detected vehicle's environment and running state in accordance with the driver's sense of driving. The danger index is calculated by the fuzzy induction from the membership functions which are determined in advance in accordance with a general driver's sense of driving. The running state of the vehicle such as the speed is controlled in accordance with the danger index. When the manipulated variable is changed by the driving operation of the driver, the danger index is adjusted in accordance with the amount of change. The change by the driving operation of the driver is reflected as the change in the membership functions. Thus, the calculated danger index gradually agrees with the driving characteristics of the driver.

U.S. Letters Pat. No. 5,218,542 to Endo et al. discloses a control system for an unmanned carrier vehicle that is capable of automatically and independently traveling along a guiding line laid on a floor and includes a steering angle control unit and/or velocity control unit. When the unmanned carrier vehicle is deviated from the guiding line, its deviation is detected by performing a time-differentiation on the deviation to determine the direction of the unmanned carrier vehicle in response to a signal from a sensor provided at a wheel of the unmanned carrier vehicle. Based on a result of a fuzzy inference performed on the deviation, deviation direction and steering angle, the steering angle control unit controls the steering angle of the unmanned carrier vehicle. Similarly, the velocity control unit controls a traveling velocity of the unmanned carrier vehicle. The fuzzy inference is performed in accordance with the predetermined control regulation.

U.S. Letters Pat. No. 5,231,482 to Sieber et al. discloses a smart tracking system that includes a digital processor for selectively processing error signals representing the angular error between a tracked subject and the orientation of a tracking device/camera. In one embodiment, a user selects a set of data values representing the operating parameters of the system in a specific operational mode. The processor uses the selected variable to perform a series of computations which selectively modify the angular error signals in a manner that will produce a video picture which is visually and aesthetically pleasing to human viewers. In a second embodiment, the set of data values characterizing the operational mode of the system automatically is selected by the processor based on the past history of the subject's motion and the current operation mode of the system.

U.S. Letters Pat. No. 5,280,565 to Nomoto et al. discloses a fuzzy backward reasoning device adapted for recognition applications. The device is capable of performing a computation to update reasoning every time a feature quantity is observed and of performing the reasoning even if the order of observations is arbitrary; this is accomplished by performing sequential reasoning, instead of batch type reasoning and by feeding back a reasoned result. A target recognition device is capable of computing, as a numerical value, the reliability of a recognized result on a target by obtaining other recognition information even if there is no other information concerning the target, using the sequential type fuzzy backward reasoning device.

U.S. Letters Pat. No. 5,285,380 to Payton discloses a system for obtaining collective decisions from multiple control sources. The system is able to produce a single command from these control sources. Each control source corresponds to a behavior and each responds to inputs to produce a command. The system employs a piece-wise constant preference profile composed of zones, spikes and clamps which compress the amount of data required to process behavior preferences. The system sorts commands according to command values in a chart to produce a total profile which represents the combination of profiles of the command values for multiple behaviors. The peak zone in the total profile is then used to produce a desired response to the multiple commands. The system allows behaviors to be combined through the command fusion rather than subsumption. The piece-wise constant representation allows behavior commands to be combined after they have been passed through a standard control system. This permits behaviors to use any derivative of the control source's variable that is appropriate for their function. The system has bounded arbitration time so that control loop stability will not be disrupted by the arbitration process. The system also incorporates a method for smoothing behavior switching transients.

Several features of the control systems disclosed in the foregoing patents are antithetical in applications such as submarine launched torpedo guidance applications. Each control system disclosed in the patents is located on a vehicle used as a steerable object; in a submarine application, the control system must be located on the submarine remotely from the torpedo as a steerable object. Moreover in a submarine application, both the submarine and target usually undergo motion relative to each other and relative to the torpedo. The systems disclosed in some of the patents monitor only a fixed line so the system only needs to respond to deviations in the direction of vehicle travel relative to the reference line. Finally, many of the fuzzy control systems select control rules on the basis of one set of related parameters, namely deviation and a derived rate of change of deviation that is modified by vehicle speed. Such a system uses a single set of control rules derived from a single input; in a submarine application the system control rules are derived from two inputs representing the state of the steerable object or vehicle and the target. Consequently systems based upon the above-identified prior art patents will not work well in a submarine environment.

SUMMARY OF THE INVENTION

Therefore it is an object of this invention to provide an improved target intercept guidance system at a first site for guiding an object as it moves from the first site toward a second site.

Another object of this invention is to provide a target intercept guidance system using fuzzy control that operates from a first site for guiding an object from the first site toward a second site wherein both the first site and second site can undergo independent motion.

Still another object of this invention is to provide a target intercept guidance system including fuzzy control for steering a torpedo from a submarine toward a target.

Yet still another object of this invention is to provide a target intercept guidance system with fuzzy control for use with submarine launched torpedoes that can be adapted for use in a variety of situations.

Still yet another object of this invention is to provide a target intercept guidance system for submarine launched torpedoes that can operate automatically and can readily accommodate diverse operating circumstances.

In accordance with this invention, a target intercept guidance system located at a first site communicates with a steerable object over a communications link and guides the steerable object from the first site toward a second site. The guidance system operates iteratively and during each iteration determines a relative bearing from the steerable object to the second site and the rate of change of that bearing. A fuzzy control system utilizes these bearings and the rate of change of the bearings to generate a guidance command for transfer over the communications link to direct the steerable object according to a set of logical guidance rules and to cause the steerable object to intercept the second site along its course.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

FIG. 6 depicts a rule based matrix incorporated in the rule based unit of FIG. 5;

DESCRIPTION OF THE PREFERRED EMBODIMENT

Figure 1:
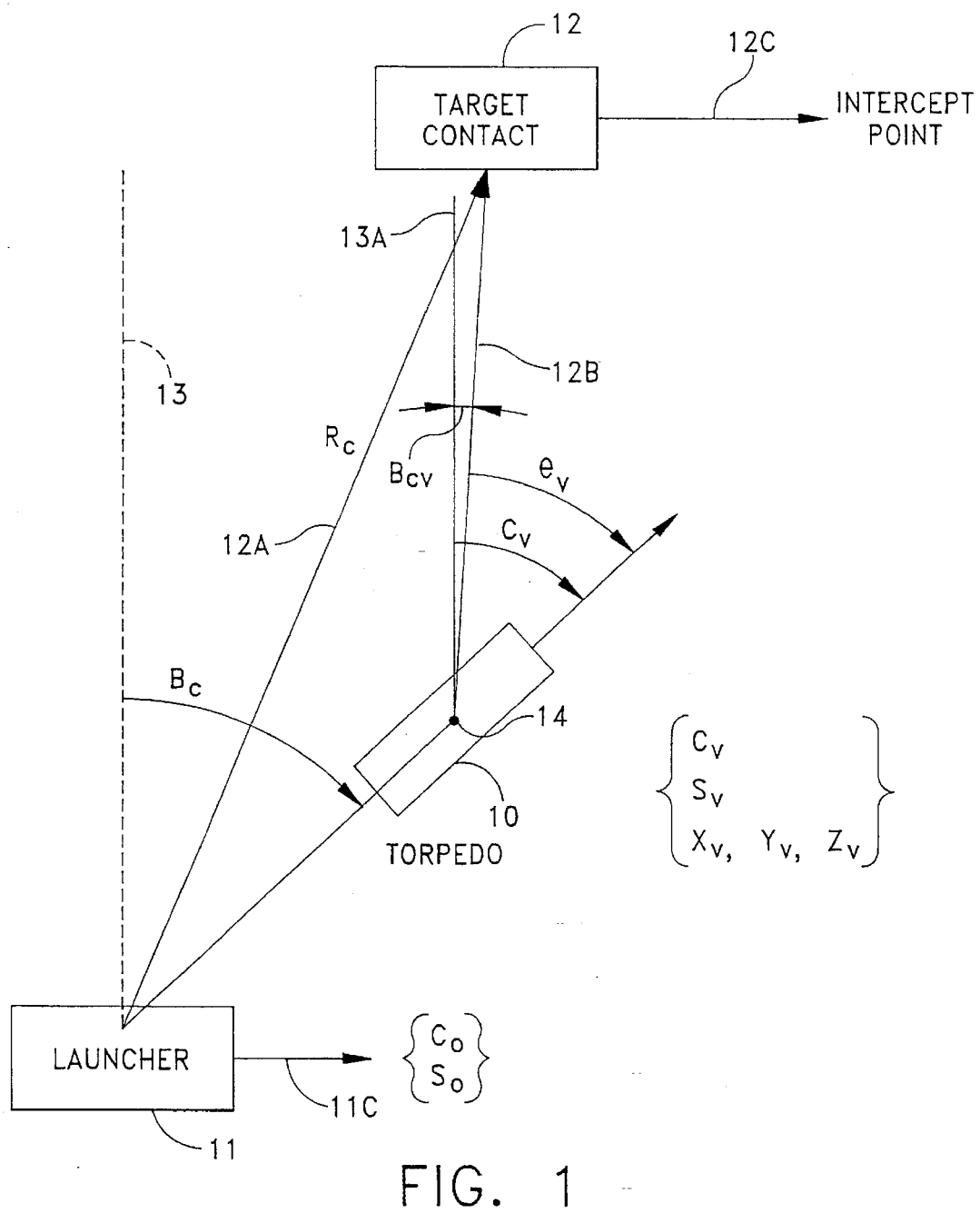
FIG. 1 depicts various relationships among a first site, a second site and a steerable object that are useful in understanding this invention.

FIG. 1 depicts a torpedo 10, as an example of a steerable object, that is moving from a first site, shown as a launcher 11, toward a second site, shown as a target or contact 12. The torpedo 10 has a position ($X_V$, $Y_V$ and $Z_V$), a course ($C_V$) and a speed ($S_V$). The launcher 11 is moving along a course $C_o$ and at speed $S_o$ as represented by an arrow 11C while the target is moving along an arbitrary course at an arbitrary speed, both of which are unknown and represented by an arrow 12C. Each of these course lines 11C and 12C are normally measured with respect to some reference shown by a dashed line 13 in FIG. 1, typically magnetic north. In this embodiment it is assumed that the torpedo 10 has a center point 14 that represents the center of control motion for the torpedo 10.

Figure 2:
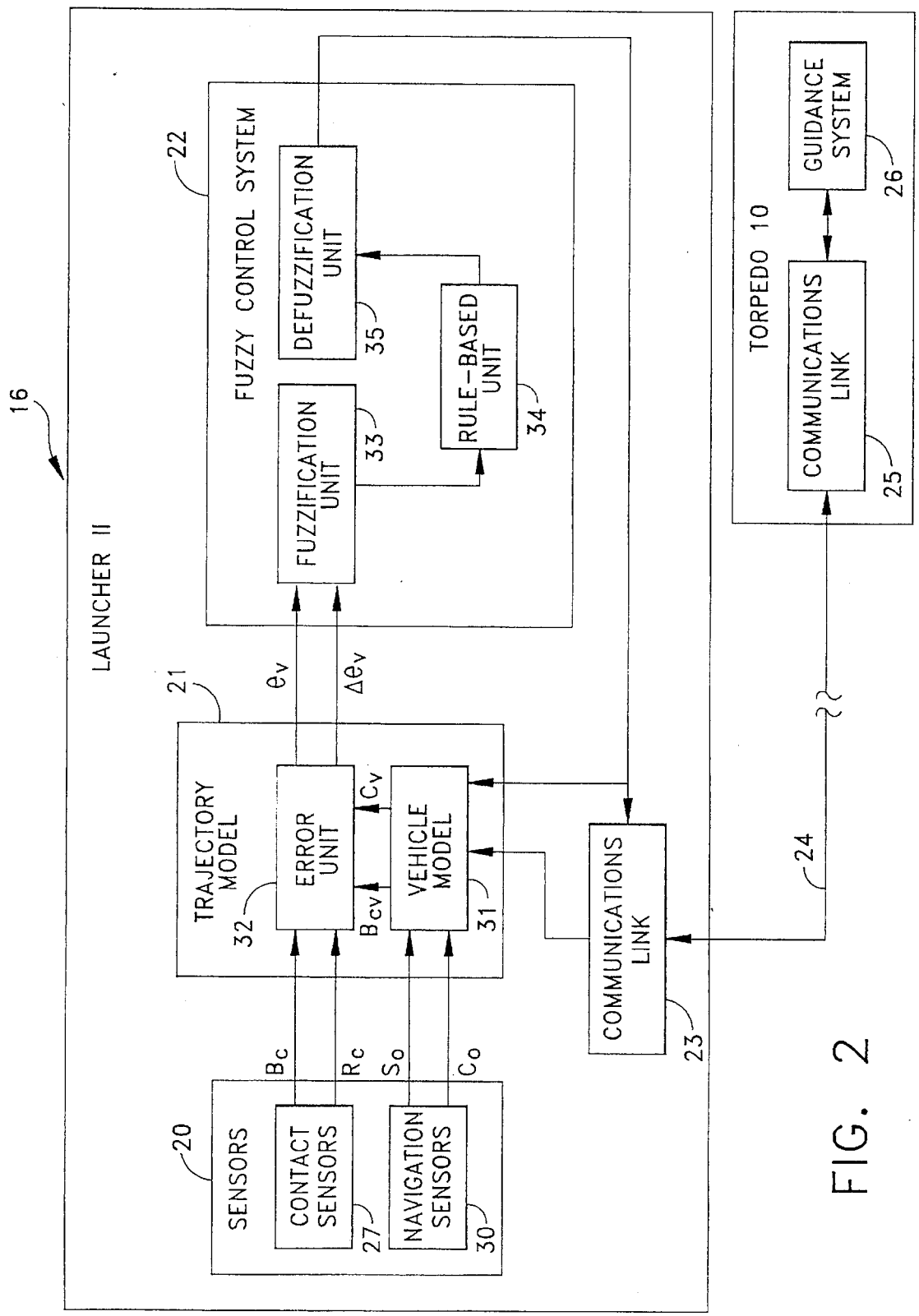
FIG. 2 is a block diagram of a target intercept guidance system constructed and operated in accordance with this invention.

Referring now to FIG. 2, a target intercept guidance system 16 constructed in accordance with this invention includes sensors 20 that measure various parameters associated with the target 12 and the launcher 11. A trajectory model 21 processes data from the sensors 20 and generates a set of error functions (first and second sensed variables) for a fuzzy control system 22 that classifies each of the error functions into one or more sensed linguistic variables from a corresponding set of predetermined sensed linguistic variables based upon their associated sensed variable membership functions. This control system 22 logically combines the selected ones of the first and second sensed linguistic variables for identifying one or more control output linguistic variables and corresponding control output membership functions from a control output membership function set. The control system 22 also converts the selected control output membership function or functions into a guidance command.

A communications link 23 transfers the guidance command over a bidirectional communications channel 24, typically formed by a wire connected to the torpedo 10, to another communications link 25 and a guidance system 26 in the torpedo 10. Information from the torpedo 10 also transfers through the communication link 23 to the trajectory model 21.

Figure 3A:
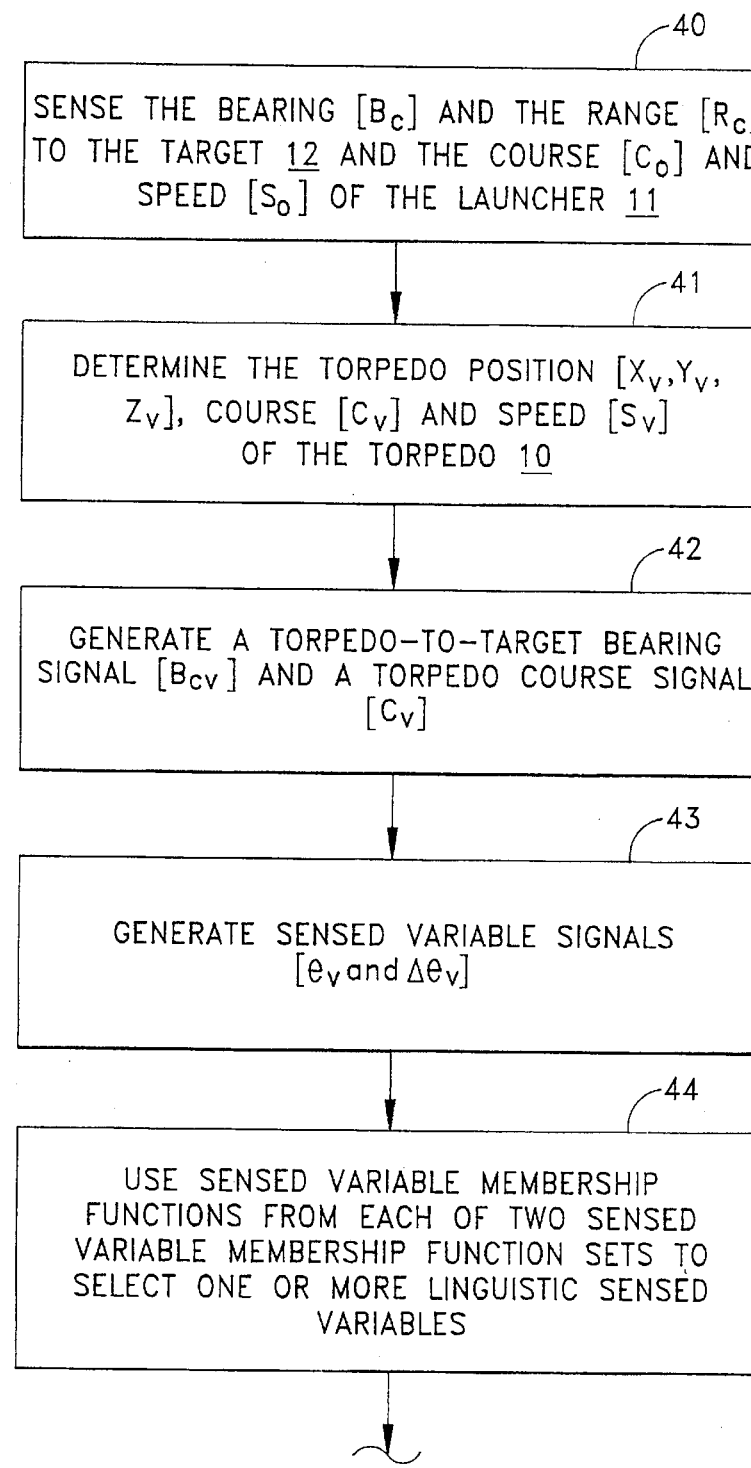
FIGS. 3A and 3B constitute a flow diagram that depicts the operation of the guidance system in FIG. 2.

Referring to FIGS. 1 and 2, the sensors 20 include contact sensors 27 that produce a bearing, $B_C$, defined by the angle between the reference 13 and a line 12A to the target 12 and a range, $R_c$, to the target 12 along the line 12A. Navigation sensors 30 of FIG. 2 simultaneously define the course $C_o$ and speed $S_o$ of the launcher 11. As shown in FIG. 3A, this activity occurs during step 40 that is the first step in an iterative process disclosed by the remaining steps in FIGS. 3A and 3B. That is, FIGS. 3A and 3B define each step that occurs during each iteration.

In step 41 (FIG. 3A) a vehicle model 31 (FIG. 2) provides the position ($X_V$, $Y_V$ and $Z_V$), course ($C_V$) and speed ($S_V$) of the torpedo 10. This information can be obtained utilizing information supplied by the navigation sensors 30 and open loop or dead reckoning updates to the vehicle model 31 or supplemented with information from the torpedo 10.

Whatever the inputs, the vehicle model 31 produces two signals for an error unit 32. One is a $B_{CV}$ signal that represents the bearing defined by the angle between a reference line 13A parallel to the reference line 13 in FIG. 1 and a line 12B from the torpedo 10 to the target 12 that represents the bearing of the target 12 relative to the torpedo 10. The second is the $C_V$ signal that represents the bearing or the course of the torpedo 10. This occurs during step 42 in FIG. 3A.

In the guidance system 16, the error unit 32 produces an $e_v$ error signal as a first sensed variable corresponding to the instantaneous difference between the bearing from the torpedo 10 to the target 12 (i.e., $B_{CV}$) and the course of the torpedo 10 (i.e., $C_V$). The error unit 32 also produces an $\Delta e_v$ error signal that represents another sensed variable corresponding to the rate of change of the $e_v$ error signal. The error unit 32 uses the error signal, $e_v$, between the bearings $B_{CV}$ and $C_V$ to develop this rate of change error signal. If the guidance system 16 in FIG. 2 repeats the operation once per second, the difference between $|e_{V(k)}|$ and $|B_{cv(k-1)} - C_{V(k)}|$ determines the rate at which the error angle $e_v$ changes in degrees per second. More specifically, during step 43 of each iteration of FIG. 3A the error unit 32 in FIG. 2 converts the incoming signals into error and error rate signals representing the sensed variables as follows:

$$e_V = B_{CV} - C_V \qquad (1)$$

and $$\Delta e_V = |B_{CV} - C_V|_k - |B_{CV(K-1)} - C_{V(k)}| \qquad (2)$$

Figure 4A:
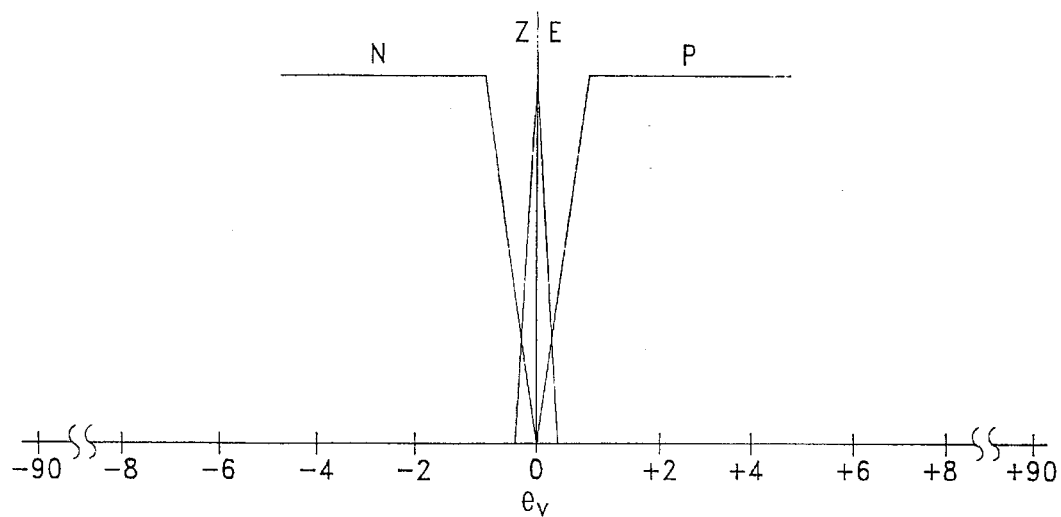
FIGS. 4A, 4B and 4C are graphical representations of linguistic variables and their associated membership function sets that are useful understanding in this invention.

Step 44 in FIG. 3A represents a procedure by which the control system 22 of FIG. 2 encodes each of the error signals representing the sensed variables into one or more corresponding sensed linguistic variables based upon sensed variable membership functions from corresponding sensed variable membership function sets. FIG. 4A, for example, discloses an $e_v$ sensed variable membership function set with three sensed variable membership functions and their corresponding sensed $e_v$, or "error" linguistic variables while FIG. 4B discloses an $\Delta e_v$ sensed variable membership function set with seven $\Delta e_v$ sensed variable membership functions and their corresponding sensed $\Delta e_v$, or "error rate" linguistic variables.

Assuming that the following relationships exist $$x1 = e_v \quad (3)$$

and $$x2\Delta = e_v \quad (4)$$

a fuzzification unit 33 in FIG. 2 uses the $e_v$ signals to select one or more of three available $e_v$ sensed bearing error linguistic variables and the $\Delta e_v$ signal to select one or more of seven available $\Delta e_v$ sensed error rate linguistic variables. The possibilities in this particular embodiment, that includes the "error" and "error rate" linguistic variables T(x1) and T(x2) respectively, can be designated as:

$$T(x1) = (T^1_{x1}, T^2_{x1}, T^3_{x1}) \quad (5)$$
$$= (N, ZE, P)$$

and $$T(x2) = T^1_{x2}, T^2_{x2}, T^3_{x2}, T^4_{x2}, T^5_{x2}, T^6_{x2}, T^7_{x2} \quad (6)$$
$$= (NL, NM, NS, ZE, PS, PM, PL)$$

where "NL" denotes a Negative Large sensed linguistic variable; "NS", a Negative Small sensed linguistic variable; "NM", a Negative Medium sensed linguistic variable; "N", a negative sensed linguistic variable; "ZE", a Zero sensed linguistic variable; "PS", a Positive Small sensed linguistic variable; "PM", a Positive Medium sensed linguistic variable; "PL", a Positive Large sensed linguistic variable; and "P", a positive sensed linguistic variable.

Figure 4B:
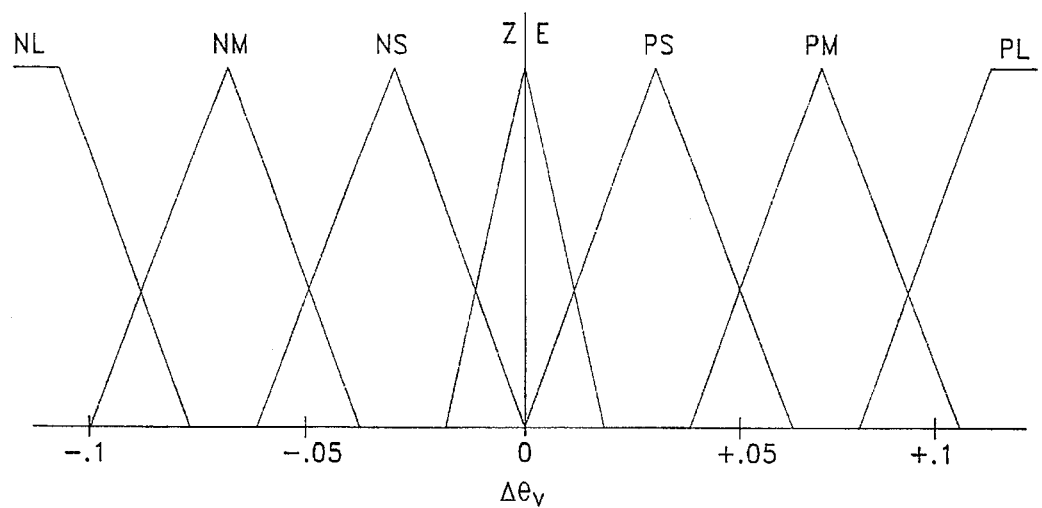

The specific set of membership functions μ(x1) and μ(x2) corresponding to inputs x1 and x2 and the sensed error and error rate linguistic variables as shown in FIGS. 4A and 4B, can be mathematically stated as follows:

$$\mu(x1) = (\mu^1_{x1}, \mu^2_{x1}, \mu^3_{x1}) \quad (7)$$

and $$\mu(x2) = (\mu^1_{x2}, \mu^2_{x2}, \mu^3_{x2}, \mu^4_{x2}, \mu^5_{x2}, \mu^6_{x2}, \mu^7_{x2}) \quad (8)$$

For j=1 and i=2 and for j=2 and i=2,3,4,5,6

$$\mu^i_{xj} = 1 - \frac{(|xj - C^i_{xj}|)}{\delta^i_{xj}} \quad (9)$$

for $$C^i_{xj} - \delta^i_{xj} \leq C^i_{xj} + \delta^i_{xj} \quad (10)$$

and $$\mu\mu^i_{xj} = 0 \quad (11)$$

for $$C^i_{xj} - \delta^i_{xj} \geq xj \geq C^i_{xj} \delta^i_{xj} \quad (12)$$

The end conditions, j=1 and i=1,3 and j=2 and i=1,7 are defined by the following equations:

$$\mu^i_{xj} = 1 - \frac{(|xj - C^i_{xj}|)}{\delta^i_{xj}} \quad (13)$$

for $$a^i C^i_{xj} \geq a^i xj \geq a^i (C^i_{xj} - a^i \delta^i_{xj}) \quad (14)$$

and $$\mu^i_{xj} = 1 \quad (15)$$

for $$a^i C^i_{xj} \leq a^i xj \quad (16)$$

and $$\mu^i_{xj} = 0 \quad (17)$$

for $$a^i (C^i_{xj} - \delta^i_{xj}) \geq a^i xj \quad (18)$$

where $a^i = 1$, except for i=1 where $a^1 = -1$.

FIG. 4A depicts graphically the relationship of each sensed error linguistic variable and associated membership function in the $e_v$ membership function set for different values of the $e_v$ signal according to a specific set of values for $C^i_{xj}$ and $\delta^i_{xj}$. FIG. 4B presents analogous information for the $\Delta e_v$ signal. In the specific embodiment shown in FIGS. 4A and 4B certain incoming signals correspond to a single or multiple sensed error and sensed error rate linguistic variables based upon corresponding membership functions. For example, in FIG. 4A the $e_v$ membership function set is used to encode an $e_v$ signal having a value 0 onl into a ZE linguistic sensed error variable whereas a value of slightly less than 0 is encoded into both N and ZE sensed error linguistic variables. Likewise the error rate membership set in FIG. 4B is used to encode a signal $\Delta e_v = 0.05$ into PS and PM sensed error rate linguistic variables while a signal $\Delta e_v = 0$ is encoded only at a ZE sensed error rate linguistic variable.

Figure 3B:
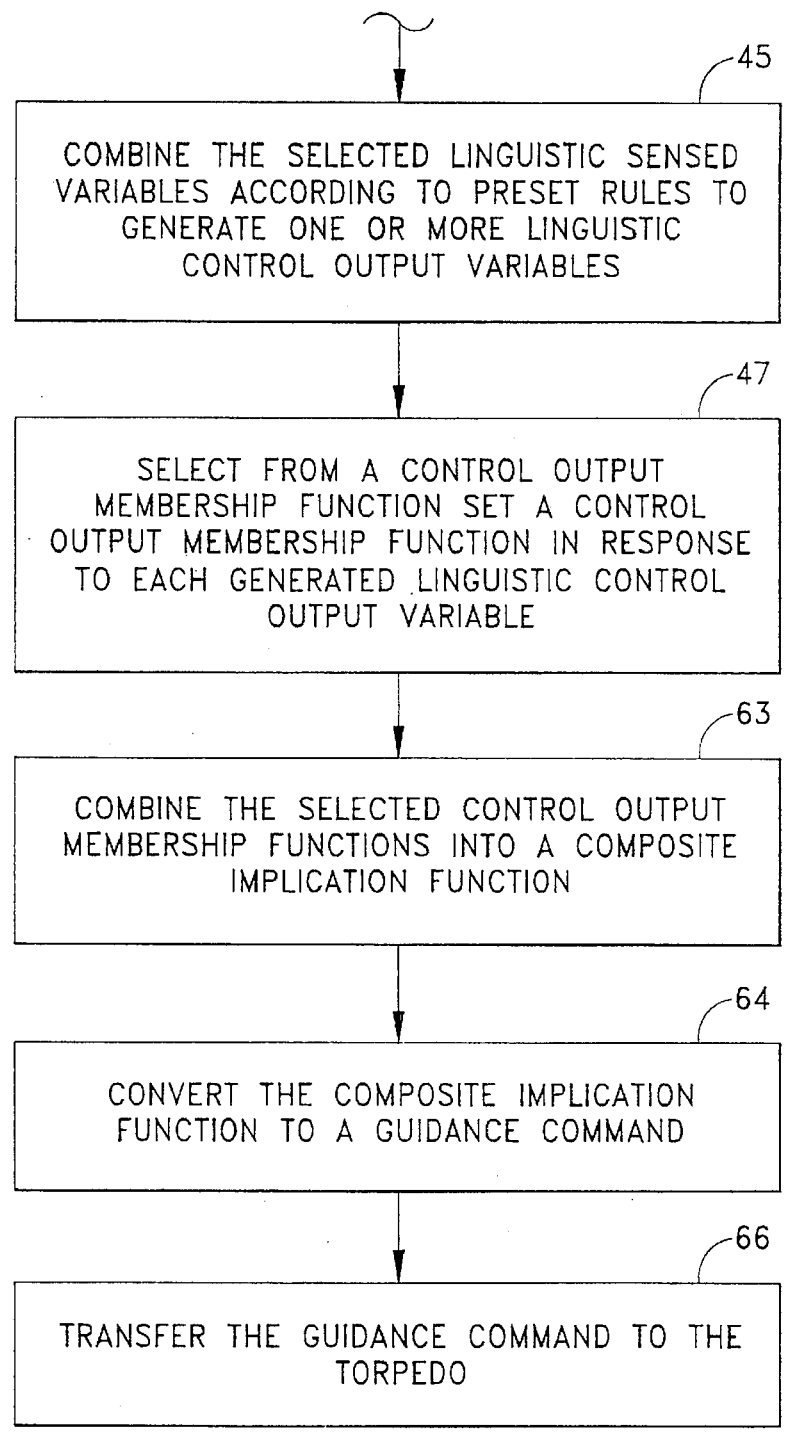
Figure 4C:
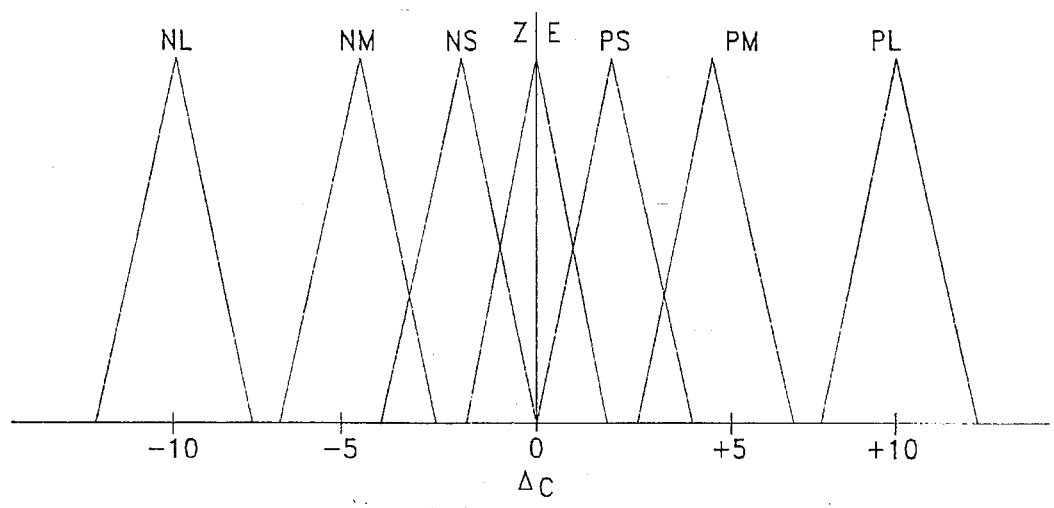
Figure 5:
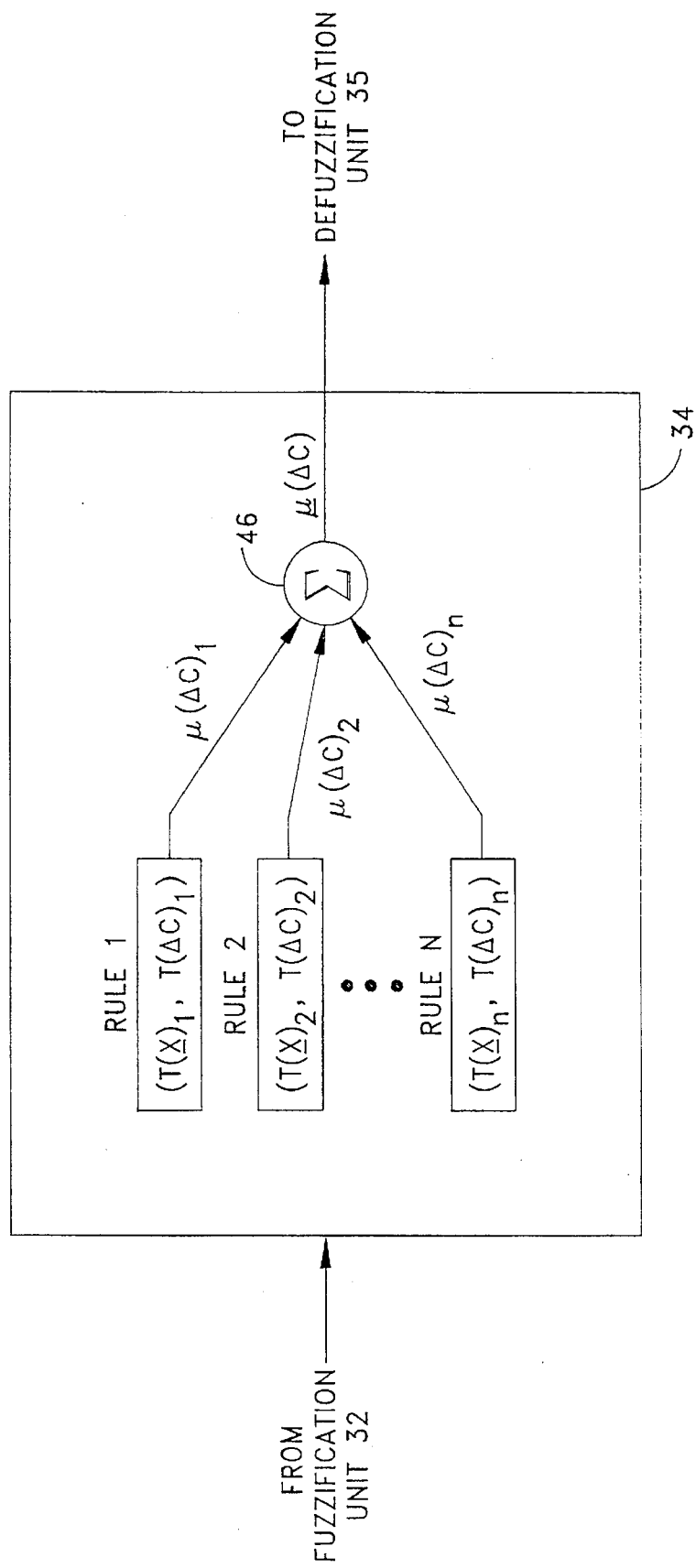
FIG. 5 schematically represents a rule based unit shown in FIG. 2.
Figure 7A:
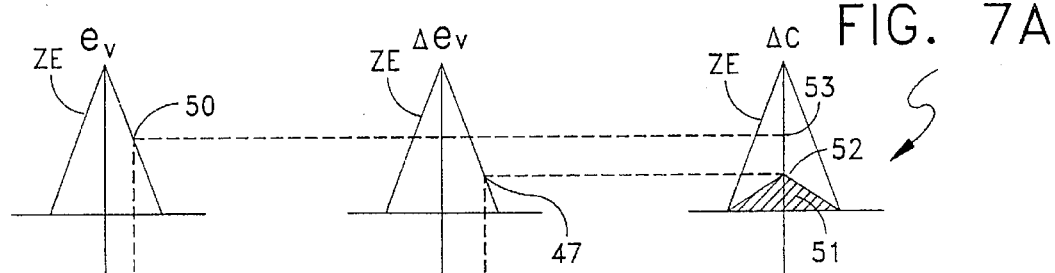
FIG. 7 includes Graphs 7A through 7E that depict the operation of the rule based unit shown in FIGS. 2 and 5.
Figure 7B:
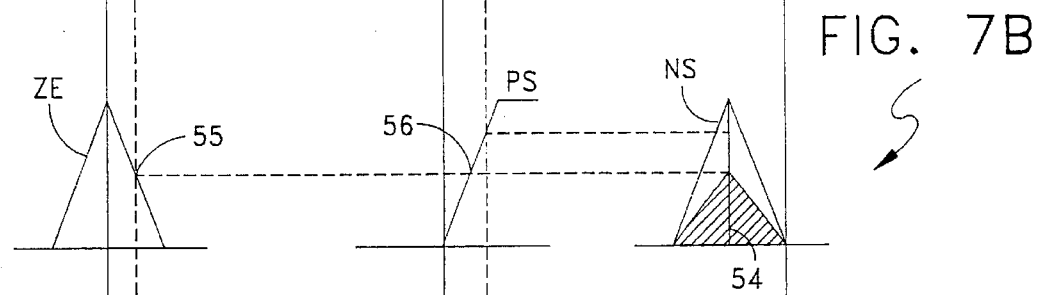
Figure 7C:
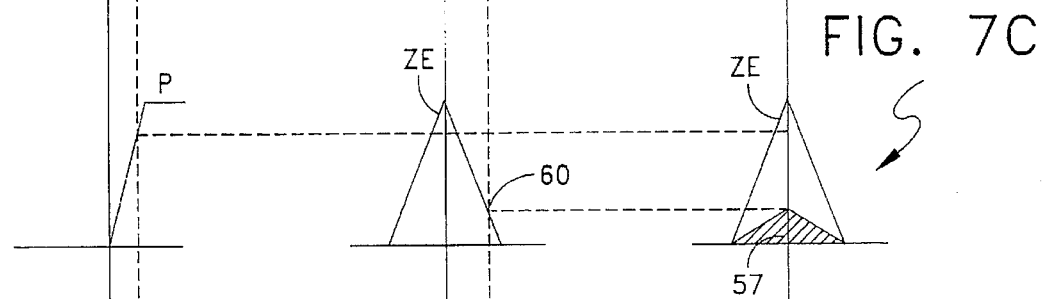
Figure 7D:
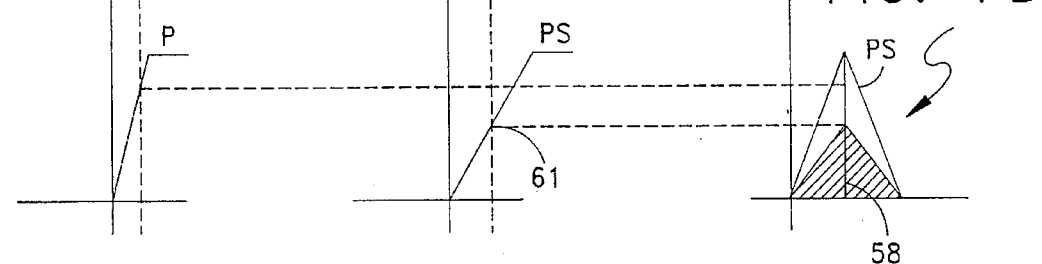
Figure 7E:
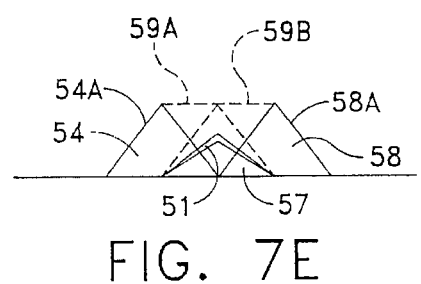

Referring to step 45 in FIG. 3B, the rule based unit 34 in FIGS. 2 and 5 combines the selected sensed error and error rate linguistic variables to produce one or more control output linguistic variables. Each selected control output linguistic variable corresponds to a predefined membership function in a control output membership function set (FIG. 4C). More specifically, each control output linguistic variable is determined according to a predetermined set of logical rules defined in FIG. 6.

The control outputs include, in this specific embodiment, seven control output linguistic variables defined as:

$$T(\Delta C) = (T^1_{\Delta c}, T^2_{\Delta c}, T^3_{\Delta c}, T^4_{\Delta c}, T^5_{\Delta c}, T^6_{\Delta c}, T^7_{\Delta c}) \quad (19)$$
$$= (NL, NM, NS, ZE, PS, PM, PL)$$

and $$\mu(\Delta C) = \{\mu_{\Delta c}^1, \mu_{\Delta c}^2, \mu_{\Delta c}^3, \mu_{\Delta c}^4, \mu_{\Delta c}^5, \mu_{\Delta c}^6, \mu_{\Delta c}^7\} \quad (20)$$

The corresponding control output membership functions are shown in FIG. 4C and can be defined, for i=1,2,3,4,5,6,7 by $$\mu^i_{\Delta c} = 1 - \frac{(|\Delta C - C^i_{\Delta c}|)}{\delta^i_{\Delta c}} \quad (21)$$

for $$C^i_{\Delta c} - \delta^i_{\Delta c} \leq \Delta C \leq C^i_{\Delta c} + \delta^i_{\Delta c} \quad (22)$$

and by $$\mu^i_{\Delta c} = 0 \quad (23)$$

for $$C^i_{\Delta C} - \delta^i_{\Delta C} \Delta C \geq C^i_{\Delta C} + \delta^i_{\Delta C} \quad (24)$$

Values for the various constants $C^i$ and $\delta^i$ are associated with different membership functions of the sensed variable and control output variable membership function sets. If $\mu(x1)$ and $\mu(x2)$ represent the sensed variable membership function sets and $\mu(\Delta C)$ represents the output control membership function set, the following table provides some specific examples:

| | $\mu(x1)$ | | $\mu(x2)$ | | $\mu(\Delta C)$ | |
|---|---|---|---|---|---|---|
| i | $C^i_{x1}$ | $\delta^i_{x1}$ | $C^i_{x2}$ | $\delta^i_{x2}$ | $C^i_{\Delta c}$ | $\delta^i_{\Delta c}$ |
| 1 | −0.5 | 0.5 | −0.12 | 0.04 | −10.0 | 2.0 |
| 2 | −0.0 | 0.5 | −0.07 | 0.03 | −5.0 | 2.0 |
| 3 | 0.5 | 0.5 | −0.03 | 0.03 | −2.0 | 2.0 |
| 4 | | | 0.00 | 0.01 | 0.0 | 2.0 |
| 5 | | | 0.03 | 0.03 | 2.0 | 2.0 |
| 6 | | | 0.07 | 0.03 | 5.0 | 2.0 |
| 7 | | | 0.12 | 0.04 | 10.0 | 2.0 |

The rule base unit 34 of FIG. 2 operates according to a series of rules defined in terms of different combinations of the sensed error and error rate linguistic variables. For example, if the fuzzification unit classifies both the $e_y$ signal as a Negative (N) sensed linguistic variable and $\Delta e_y$ signal as a Negative Large (NL) sensed linguistic variable, the rule based unit 34 will generate a positive large (PL) control output linguistic variable. FIG. 6 depicts the control output linguistic variable membership rules in matrix form for all values.

The rule base unit 34 in FIG. 5 utilizes all the possible combinations for a given set of readings to produce an output based upon the selection of one or more control output membership functions. More specifically, if the $e_y$ signals can be classified both as ZE and P sensed error linguistic variables based upon the x1 or $ea_y$ membership function set of FIG. 4A while the $\Delta e_y$ signal is encoded into ZE and PS sensed error rate linguistic variables based upon the x2 or $\Delta e_y$ membership function set of FIG. 4B, FIG. 6 discloses that the rule based unit 34 will correlate each of the possible four input combinations as follows:

IF $e_y$ is ZE AND $\Delta e_y$ is ZE THEN $\Delta C$ is ZE.
IF $e_y$ is ZE AND $\Delta e_y$ is PS THEN $\Delta C$ is NS.
IF $e_y$ is P AND $\Delta e_y$ is ZE THEN $\Delta C$ is ZE.
IF $e_y$ is P AND $\Delta e_y$ is PS THEN $\Delta C$ is PS.

Thus in step 45 the rule based unit 34 produces different output consequences or control output linguistic variables derived from these selected rules.

A summing circuit 46, symbolically referenced in FIG. 5, essentially combines each of the output variable membership functions corresponding to each of the selected control output linguistic variables to produce an output signal as shown by steps 47 and 63 in FIG. 3B. More specifically, the summing circuit 46 in FIG. 5 combines the selected control output membership functions scaled by the various sensed variable signals as illustrated in FIG. 7.

FIG. 7 depicts each of the four previously identified input combinations and correlations in Graphs 7A through 7D respectively. During the selection of the sensed linguistic variables, the fuzzification unit 33 correlates each of the sensed variable signals to a particular point on a corresponding encoding sensed variable membership function. This correlation provides scaling for each control output membership function through the selection of the lower of the intercepts of the input signals with the corresponding sensed variable membership functions incorporated in the specific rule.

For example, in the case of the first rule shown in Graph 7A, an intersection 47 of the $\Delta e_y$ signal with ZE membership function is lower than the intersection 50 of the $e_y$ signal with its selected ZE membership function, so the $\Delta e_y$ signal controls the magnitude of the selected ZE control output membership function by establishing a scaled triangular output function 51 with its peak at intersection 52 rather than the intersection 53. In a similar fashion, the second rule depicted in Graph 7B produces a triangular form 54 based upon an intersection 56 of the $e_y$ signal with the ZE sensed variable membership function that is lower than an intersection 55 of the $\Delta e_y$ signal with its corresponding PS membership function. Similarly the rules depicted in Graphs 7C and 7D provide triangular forms 57 and 58 respectively based upon a lower intersection 60 of the $\Delta e_y$ signal in FIG. 7C and upon a lower intersection 61 of the $\Delta e_y$ signal in FIG. 7D.

Stated mathematically, the inferred control output functions from each of the identified rules are, respectively, (1) $\zeta_{(1)}\mu^4_{\Delta C}$, (2) $\zeta_{(2)}\mu^3_{\Delta C}$, (3) $\zeta_{(3)}\mu^4_{\Delta C}$ and (4) $\zeta_{(4)}\mu^5_{\Delta C}$ where:

$\zeta_{(1)}\mu^4_{\Delta C} = \mu(\Delta C)_{(1)} = $ the control output function for rule 1 defined by $\mu^4_{\Delta C}$ multiplied by the value $\zeta_{(1)}$; and $\zeta_{(2)}\mu^3_{\Delta C} = \mu(\Delta C)_{(2)} = $ the control output function for rule 2 defined by $\mu^3_{\Delta C}$ multiplied by the value $\zeta_{(2)}$.

$\zeta_{(3)}\mu^4_{\Delta C} = \mu(\Delta C)_{(3)} = $ the control output function for rule 3 defined by $\mu^4_{\Delta C}$ multiplied by the value $\zeta_{(3)}$; and $\zeta_{(4)}\mu^5_{\Delta C} = \mu(\Delta C)_{(4)} = $ the control output function for rule 4 defined by $\mu^5_{\Delta C}$ multiplied by the value $\zeta_{(4)}$;

and $$\zeta_{(1)} = Y^2_{x1} \wedge Y^4_{x2} = min(Y^2_{x1}, Y^4_{x2}) \quad (25)$$

$$\zeta_{(2)} = Y^2_{x1} \wedge Y^5_{x2} = min(Y^2_{x1}, Y^5_{x2}) \quad (26)$$

$$\zeta_{(3)} = Y^3_{x1} \wedge Y^4_{x2} = min(Y^3_{x1}, Y^4_{x2}) \quad (27)$$

$$\zeta_{(4)} = Y^3_{x1} \wedge Y^5_{x2} = min(Y^3_{x1}, Y^5_{x2}) \quad (28)$$

where $Y^i_{xj}$ is $\mu^i_{xj}$ evaluated at a specific sensed input xj(t) at time "t" and where "$\wedge$" denotes a fuzzy 'and'/or minimum. The control output composite implication function, $\mu(\Delta C)$, of the rule-based unit for this example is expressed as:

$$\mu(\Delta C) = \mu(\Delta C)_{(1)} + \mu(\Delta C)_{(2)} + \mu(\Delta C)_{(3)} + \mu(\Delta C)_{(4)} \quad (29)$$

As previously indicated, the ruled based unit 34 in FIGS. 2 and 5 also operates in accordance with step 63 of FIG. 3B by combining the scaled fuzzy output membership functions shown in FIG. 7 into a composite output function that is acceptable for use in the defuzzification unit 35. A number of methods can be utilized for converting composite outputs into guidance commands in step 64. The defuzzification unit 35 uses a centroid method to provide guidance commands. Mathematically the centroid is computed as follows:

$$\Delta C_0 = \frac{\sum_k [(\zeta_{(k)} C_{\Delta c_{(k)}}) I_{\Delta c_{(k)}}]}{\sum_k \zeta_{(k)} I_{\Delta c_{(k)}}} \quad (30)$$

where $\Sigma_{(k)}$ is the summation over all the rules selected by the rule based unit 34 and $I_{\Delta C(K)}$ and $C_{\Delta C(k)}$ are the respective area and centroid of the kth rule consequent set membership function. This is represented in Graph 7E that depicts the superposition of the scaled control output membership functions of Graphs 7A through 7D. The resulting or composite output function is the sum of the selected control output functions shown in Graphs 7A through 7D. This composite function includes the area between dashed lines 59A and 59B plus the sides 54A and 58A of the functions 54 and 58, respectively, from the dashed lines 59A and 59B. The defuzzification unit 35 calculates the centroid for the function shown in FIG. 7E to produce a resulting $\Delta C_O$ signal that is the finite signal for controlling the torpedo 10 in FIG. 1.

The communications link 23 transfers the command signal over the communications channel 24 to the communications link 25 in step 66 of FIG. 3B. The torpedo guidance system 26 responds to any command requiring a course alteration by changing the path of the torpedo 10 so as to maintain a target intercept trajectory.

Figure 8A:
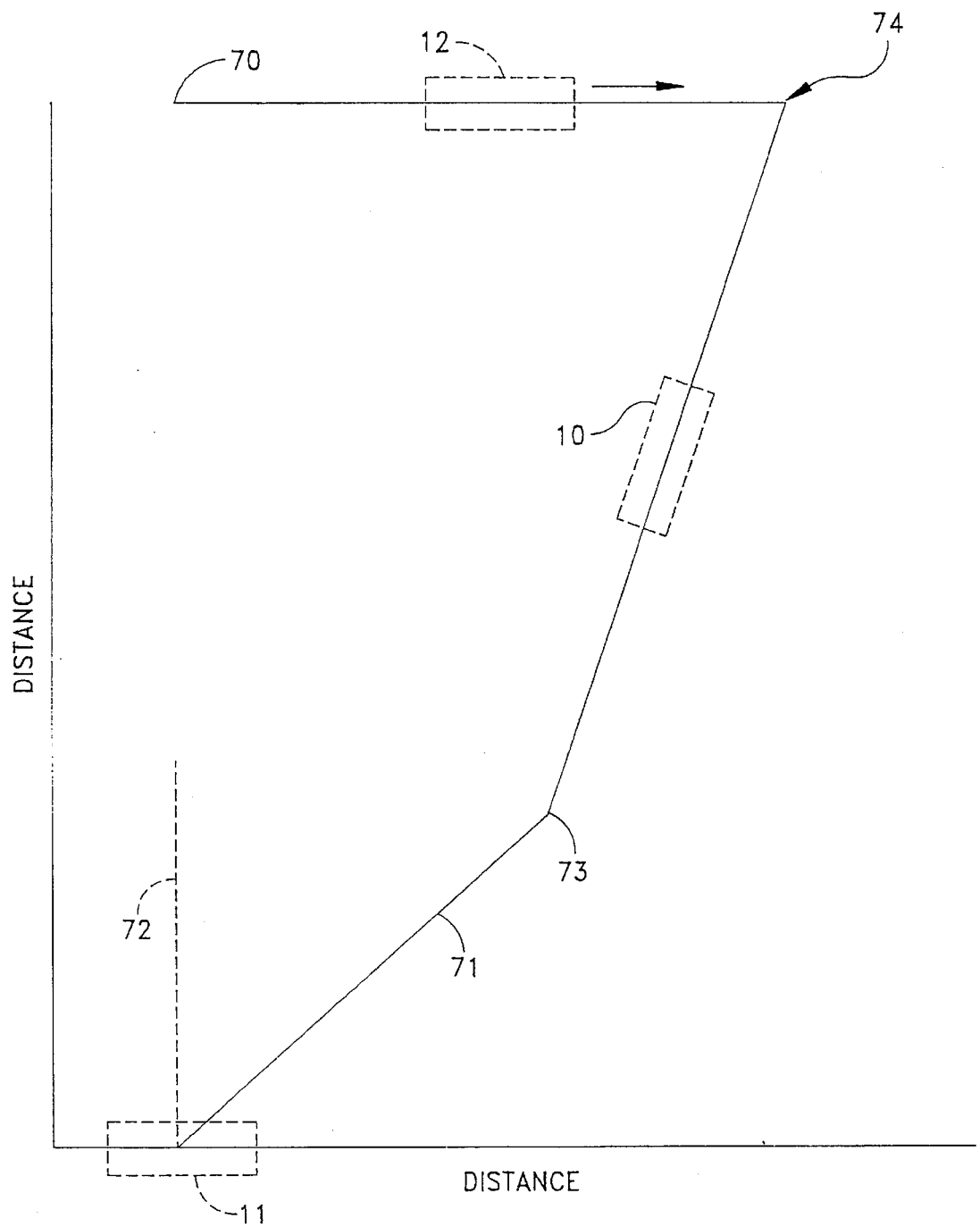
FIGS. 8A, 8B and 8C depict the operation of the guidance system shown in FIG. 2 when a target does not maneuver.

FIG. 8A depicts a sample trajectory of a torpedo 10 as it moves from a launcher 11 represented at position 11 to a moving target 12. In this particular example it is assumed that the launcher is stationary, that target tracking commenced at a position 70 and that the torpedo 10 was launched along a track 71 essentially at 45° to an initial bearing line 72. In accordance with accepted procedures the torpedo initially advances along the track 71 independently of the control system in FIG. 2. The guidance system 16 in FIG. 2 takes control of the torpedo at position 73.

Figure 8B:
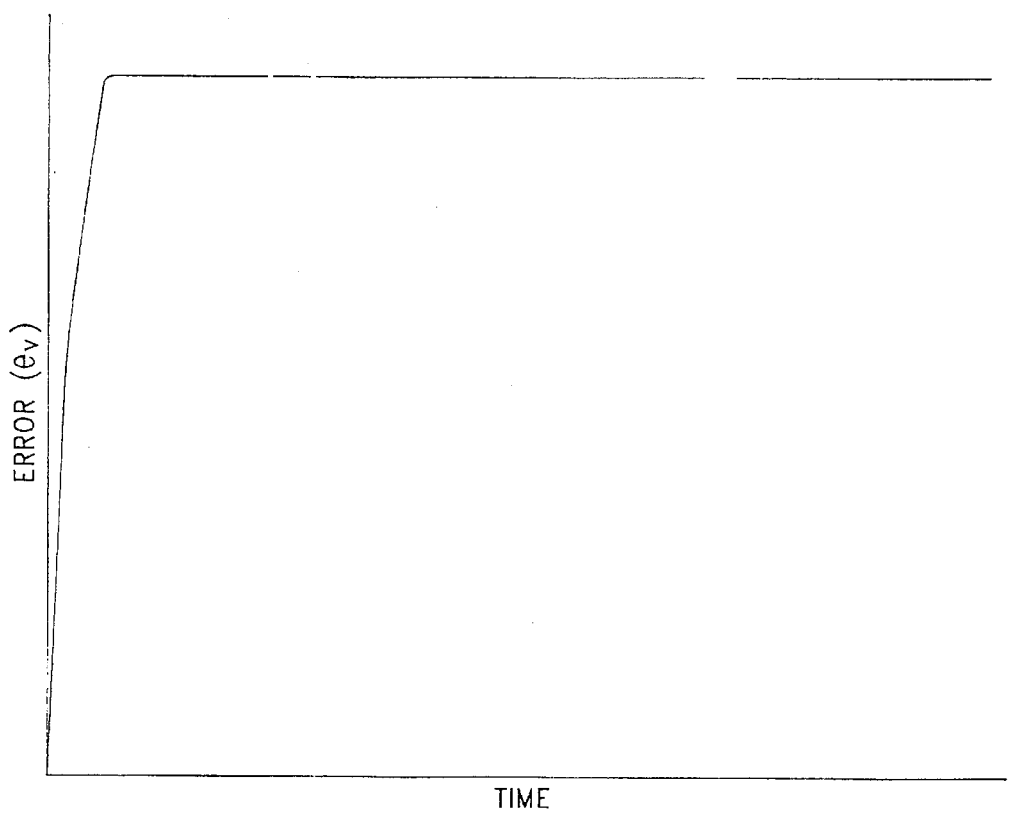
Figure 8C:
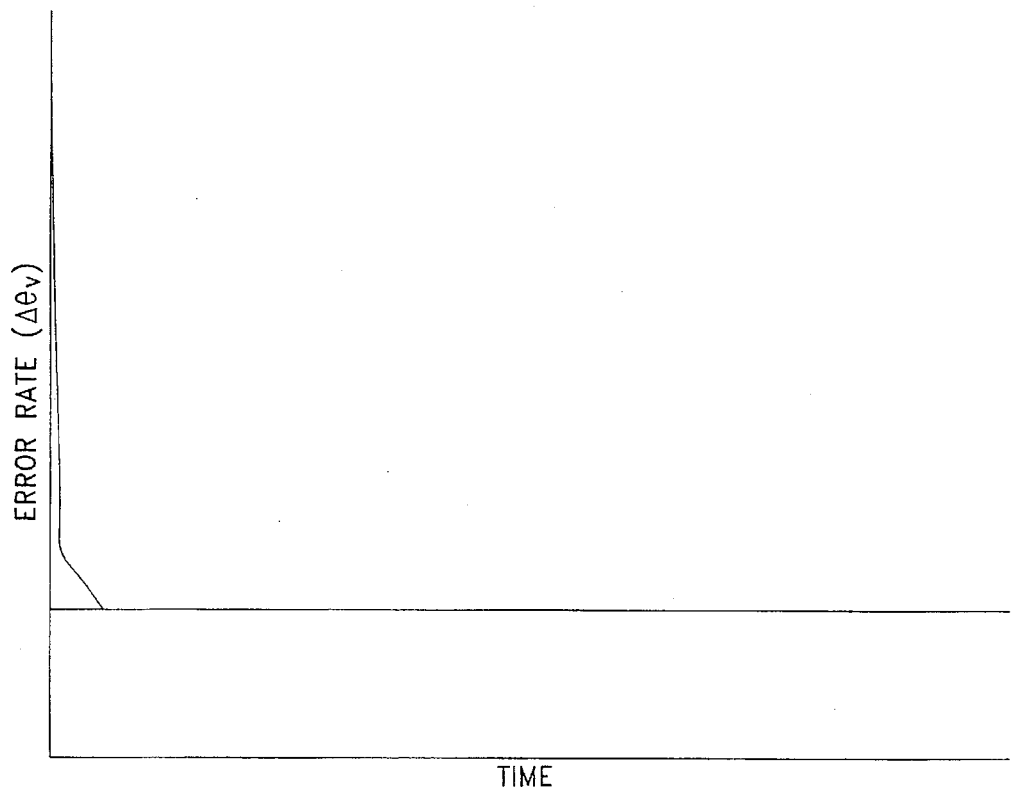

In this example, the target 12 moves from position 70 to the right without maneuvering. The control system directs the torpedo 10 along a straight line to an intercept point 74. Referring to this operation in more detail, the control circuit in FIG. 2 takes control at a point 73 along the trajectory shown in FIG. 8A. This is at a time $t_r=0$ represented in both FIGS. 8B and 8C that depict the time variations of the $e_r$ and $\Delta e_r$ signals. As shown in FIG. 8B, the initial error $e_r$ is small but the rate of change of the error is at a high positive value. The control system 22 produces commands which result in a counterclockwise turn at point 73. Now the relative bearing or error $e_r$ increases, but the rate of the error decreases to zero.. Thereafter the torpedo 10 travels along a straight line course because, as well known, if two objects on different courses proceed at a constant relative bearing to each other, (i.e., $\Delta e_r=0$) the two objects will reach an intercept point.

Figure 9A:
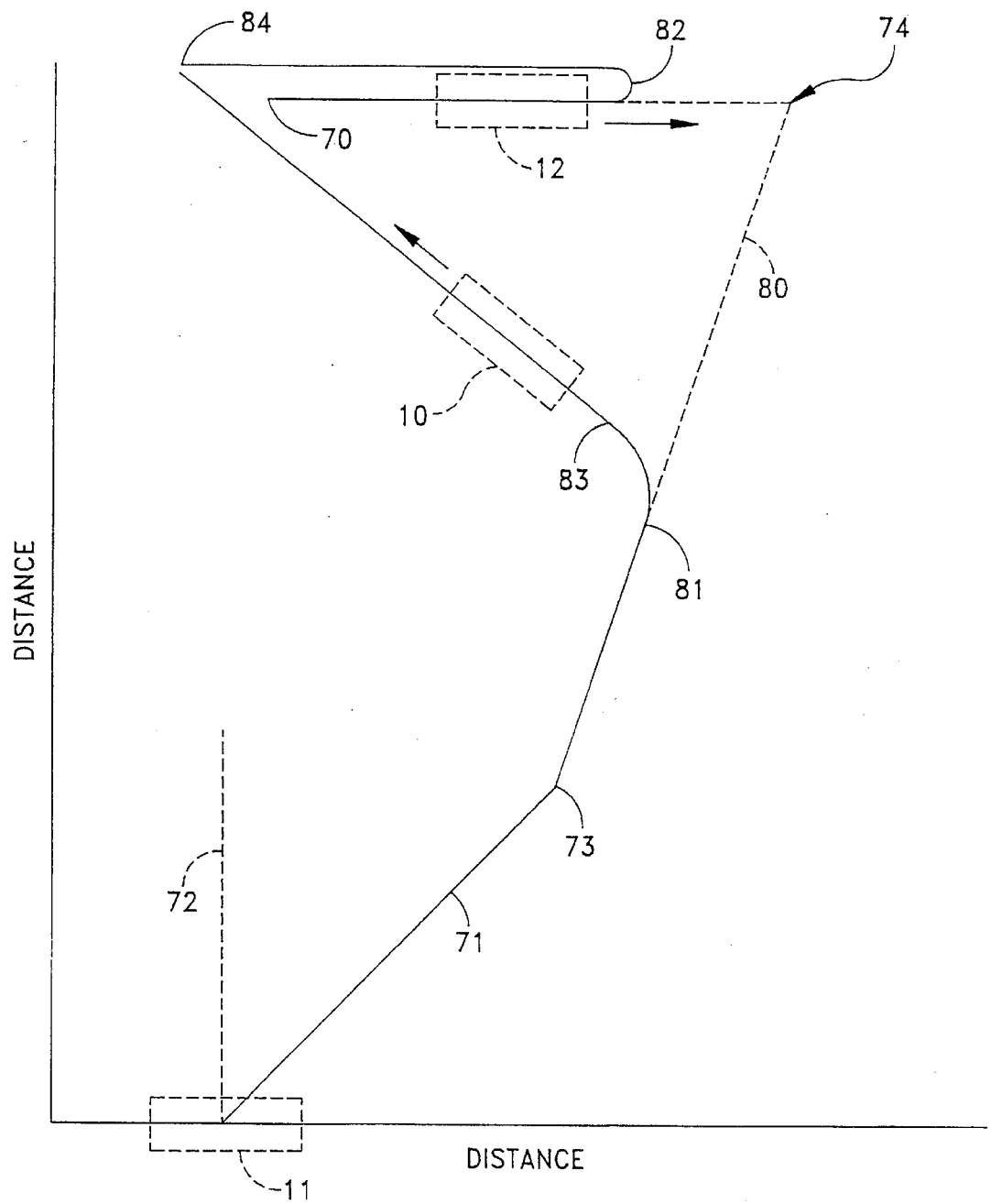
FIGS. 9A, 9B and 9C depict the operation of the guidance system shown in FIG. 2 when a target does maneuver.
Figure 9B:
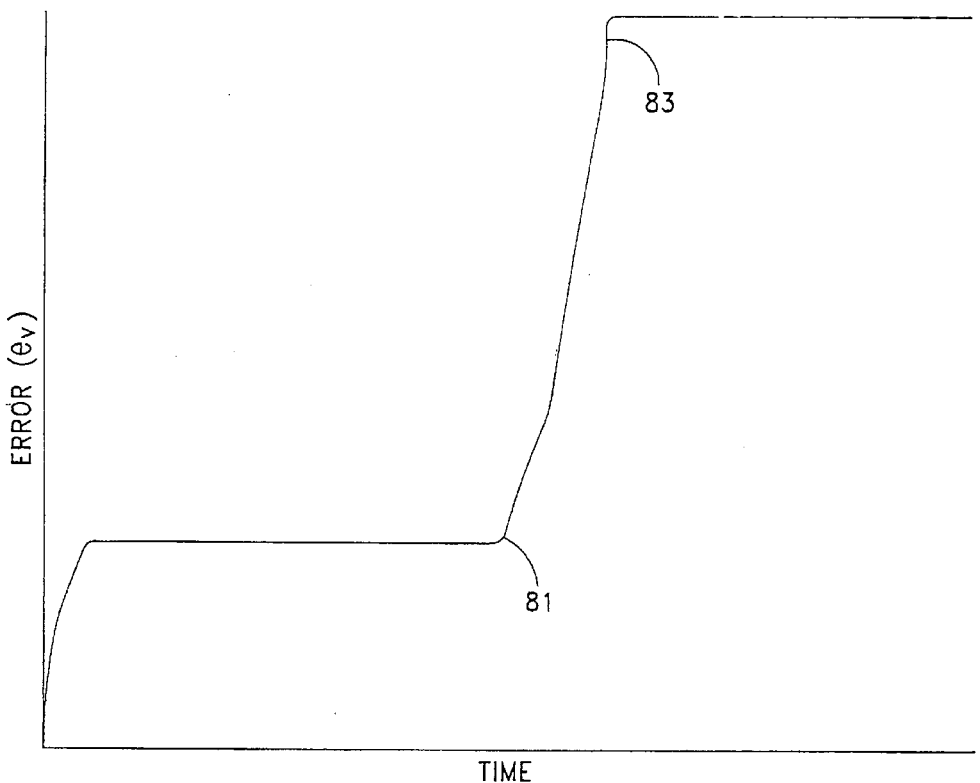
Figure 9C:
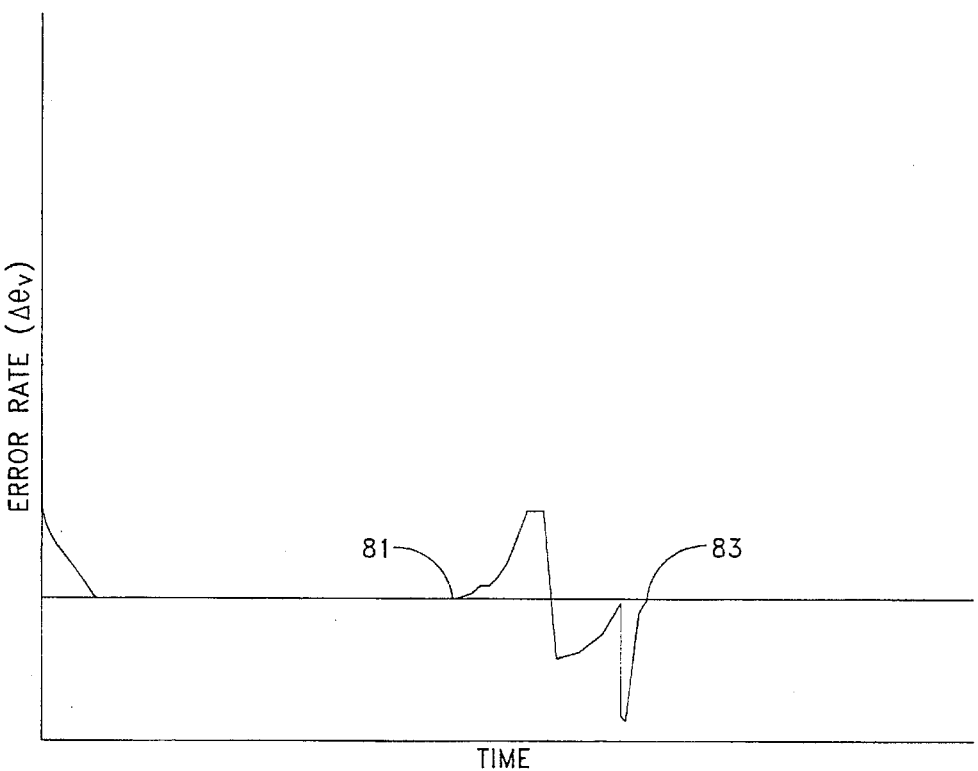

FIGS. 9A, 9B and 9C depict the operation of the guidance system 16 shown in FIG. 2 when a target 12 maneuvers after the torpedo 10 is launched. As shown in FIG. 9A, the launcher 11 initiates the travel of the torpedo 10 along a line to a point 73 at which the guidance system takes over control. As previously shown, the control system begins to guide the torpedo along a line 80 to an initial intercept 74 in the same way as described with respect to FIGS. 8A through 8C. However, as the torpedo reaches a point 81 the target 12 begins a 180° turn represented at 82 on the target path. Initially the difference between the original course along the line 80 and the bearing to the target will increase in a positive manner such that the error rate function shown in FIG. 9C increases while the actual relative bearing has a negative value as shown at 81 representing the beginning of the turn of the target 12. This positive going error rate produces a negative, or counter clockwise, turn that ends at reference point 83 the error shifts to a positive value and the error rate returns to a zero value as shown by corresponding points 83 in FIGS. 9B and 9C. As will be apparent, as the torpedo turns from point 81 to point 83 in FIG. 9A, the error rate signal will decrease rapidly during part of the turn and then as the rate will increase as the relative bearing increases until such time as the target has completed the maneuver (reference point 83). If no further maneuvering occurs, the error rate will again remain constant at zero and a target intercept will occur at 84.

Thus in accordance with this invention, a guidance system 16 as shown in FIG. 2 combines the range and bearing to a contact or target and information about the operation of a torpedo to determine an angle between the bearing from the torpedo to the target and the course of the torpedo. These signals are sampled on a regular iterative basis, so data from two successive sets of signals also provides the rate of change of that angle. The fuzzification unit 33 uses corresponding sensed variable membership functions to encode each of the inputs obtained during one iteration into one or more sensed linguistic variables. A rule-based unit 34 converts these selected sensed linguistic variables into one or more control output linguistic variables that correspond to control output membership functions of a control output membership function set that then can be combined by diverse procedures to obtain a control signal.

As is apparent, this control system 22 emulates operations that reflect heuristic considerations through the utilization of a rule-based expert system that is contained in the matrix of FIG. 6 and that operates with linguistic variables. This system includes knowledge based upon specific experimental data and the experience of individuals.

This invention has been described in terms of block diagrams, processes and graphical analysis that will enable anyone of ordinary skill in control systems art to construct a specific embodiment of such a control system. It will be apparent that many modifications can be made to the disclosed apparatus without departing from the invention. Therefore, it is the intent of the appended claims to cover all such variations and modifications as come within the true spirit and scope of this invention.

What is claimed is:

1. A system for guiding a steerable object on a minimum time and minimum distance path trajectory launched from a first moving site toward a second site comprising:

sensing means for generating bearing and range signals at said first site representing the bearing and range from said first site to the second site;

steerable object model means for generating signals based upon the signals from said sensing means representing the bearing, course, speed and position of the steerable object;

error signal generating means responsive to the signals from said sensing means and steerable object model means for generating a first sensed variable signal based upon the bearing from said steerable object to said second site and the course of said steerable object and a second sensed variable signal based upon the rate of change of the first sensed variable signal;

fuzzy control means responsive to said first and second sensed variable signals for generating a guidance command at said first site for remotely controlling said steerable object in response to a plurality of fuzzy logic rules; and means for transferring the guidance command to said steerable object.

2. A guidance system as recited in claim 1 wherein said fuzzy control means includes first storage means for storing first and second sets of sensed linguistic variables and associated sets of sensed variable membership functions and first selection means for selecting said sensed linguistic variables based upon the sensed first and second variable signals and said sensed variable membership functions.

3. A guidance system as recited in claim 2 wherein said fuzzy control means includes means for generating said first and second sets of sensed variable linguistic variables from membership function sets corresponding to the first and second sensed variable signals.

4. A guidance system as recited in claim 2 wherein said fuzzy control means includes second storage means for storing a set of control output linguistic variables and associated sets of membership functions and second selection means for combining the first and second sets of sensed linguistic variables to produce at least one corresponding control output linguistic variable and control output based upon the control output membership functions corresponding to the at least one control output linguistic variable.

5. A guidance system as recited in claim 4 wherein said second selection means includes means for selecting said at least one corresponding control output linguistic variable according to a predetermined set of logical rules.

6. A guidance system as recited in claim 5 wherein said first selection means assigns a value to each selected sensed linguistic variable in response to the magnitude of said first and second sensed variable signals and said second selection means scales each selected control output membership function in response to the assigned value.

7. A guidance system as recited in claim 6 wherein said fuzzy control means includes means for combining a plurality of scaled output control membership functions into the guidance command.

8. A guidance system as recited in claim 1 wherein said error signal generating means determines a bearing from the steerable object to the second site, $B_{cv}$, and the course of the steerable object, $C_v$, and generates as the first sensed variable signal a signal $e_v$ representing the error given by:

$$e_v = B_{cv} - C_v$$

and generates as the second sensed variable signal, a signal $\Delta e_v$ representing the rate of change of the error given by $$\Delta e_v = |B_{cv} - C_v|_k - |B_{cv(k-1)} - C_{v(k)}|$$

wherein the values "k" and "k-1" represent values taken during successive measurements by said first site sensing means and said steerable object model means over a known time.

9. A guidance system as recited in claim 8 wherein a set of the first sensed variable signals provides a first selection of sensed variable membership functions for values of the bearing error and a set of the second sensed variable signals provides a second selection of said sensed variable membership functions for values of the rate of change of the error $e_v$.

10. A guidance system as recited in claim 2 wherein said first selection means assigns a value to said selected sensed linguistic variables in response to the magnitude of the first and second sensed variable signals.

11. A guidance system as recited in claim 8 wherein said fuzzy control means includes:

first storage means for storing a first set of three sensed linguistic variable signals and an associated set of variable membership functions and a second set of seven sensed linguistic variables and an associated set of sensed variable member functions corresponding to the first and second sensed variables, respectively;

first selection means for selecting said sensed linguistic variables based upon the sensed first and second variable signals and said sensed variable membership functions;

second storage means for storing a set of seven control output linguistic variables and an associated set of control output membership functions; and second selection means for combining the selected sensed linguistic variables to produce at least one control output linguistic variable to produce a control output based upon the control output membership functions.

12. A guidance system as recited in claim 11 wherein said first selection means includes means for selecting a plurality of said sensed linguistic variables from each of said first and second sets of sensed linguistic variables, wherein said second selection means includes means for selecting a control output linguistic variable in response to each combination of said selected sensed linguistic variables according to a set of logical rules and wherein said fuzzy control means additionally includes means for combining said output control membership functions corresponding to the selected control output linguistic variable.

13. A guidance system as recited in claim 12 wherein said combining means includes means for obtaining the centroid of the combined control output membership functions.

14. A guidance system as recited in claim 12 wherein said first selection means assigns a value to each selected sensed linguistic variable and said combining means includes means for scaling each said selected control output membership function by a scaling factor corresponding to the assigned values.

15. A guidance system as recited in claim 14 wherein said combining means includes means for Combining said scaled control output membership functions according to a centroid method.

16. An iterative method using fuzzy controller for guiding a steerable object on a minimum time and minimum distance path trajectory launched from a first moving site to a second site comprising, during each iteration, comprising the steps of:

determining parameters at said first site corresponding to the range and bearing from said first site to the second site, and also corresponding to the bearing, course, speed and position of the steerable object;

generating a first sensed variable signal based upon the bearing from the steerable object to he second site and the course of the steerable object, and generating a second sensed variable signal representing the rate of change of the first sensed variable signal;

generating in said fuzzy controller a guidance command at said first site for remotely controlling the steerable object according to a plurality of fuzzy logic rules in response to the first and second sensed variable signals; and transferring the guidance command from the fuzzy controller to the steerable object.

17. A method as recited in claim 16 wherein the generation of the guidance command includes the steps of retrieving from first storage means first and second sets of sensed variable membership functions based upon the sensed first and second variable signals and said sensed variable membership functions.

18. A method as recited in claim 17 additionally comprising the steps of generating first and second variable linguistic variables based upon membership function sets corresponding to the first and second sensed variable signals.

19. A method as recited in claim 17 and additionally comprising the steps of storing a get of control output linguistic variables and an associated set of control output membership functions and combining the first and second sensed linguistic variables to produce at least one corresponding control output linguistic variable and control output based upon the control output membership functions.

20. A method as recited in claim 19 wherein a selection of said at least one control output linguistic variable is according to a predetermined set of logical rules.

21. A method as recited in claim 20 wherein said selection in response to the first and second sensed variable signals includes assigning a value to each selected sensed linguistic variable in response to the magnitude of said first and second sensed variable signals and scaling each selected control output membership function in response to the assigned value.

22. A method as recited in claim 21 additionally comprising the step of combining a plurality of the scaled control output membership functions.

23. A method as recited in claim 16 wherein the generation of the sensed first and second variable signals includes the steps of determining the bearing from the steerable object to the second site, $B_{cv}$, and the course of the steerable object, $C_v$, and generating as the first sensed variable signal a signal, $e_v$, representing the error given by:

$$e_v = B_{cv} - C_v$$

and generating as the second sensed variable signal, a signal, $\Delta e_v$, representing the rate of change of the bearing error given by $$\Delta e_v = |B_{cv} - C_v|_k - |B_{cv(k-1)} - C_{v(k)}|$$

wherein the values "k" and "k-1" represent values taken during successive iterations.

24. A method as recited in claim 23 wherein the generation of the guidance command includes retrieving from a first sensed variable membership set at least one first sensed variable membership function for values of the error and retrieving from a second sensed variable membership function set at least one second sensed variable membership function for values of the rate of change of the error signal.

25. A method as recited in claim 24 wherein said generating step includes the step of assigning a value to the selected sensed linguistic variables in response to the magnitude of the sensed first and second variable signals.

26. A method as recited in claim 23 wherein said generating step includes:

selecting at least one of a set of three first sensed linguistic variables and at least one of a set of seven second sensed linguistic variables based upon the corresponding first and second sensed variable signals and sensed variable membership functions; and combining the selected sensed linguistic variables to produce at least one control output linguistic variable and to produce the control output based upon a selection from seven control output membership functions.

27. A method as recited in claim 26 whet in said generating step includes:

selecting a plurality of the sensed linguistic variables from each of said first and second sets of sensed linguistic variables and said production of the control output linguistic variable includes selecting a control output linguistic variable in response to each combination of the selected sensed linguistic variables according to a set of logical rules; and combining the output control membership functions corresponding to the selected control output linguistic variables.

28. A method as recited in claim 27 wherein the combination of the output control membership functions includes obtaining the centroid of the combined control output membership functions.

29. A method as recited in claim 27 wherein the generation of the command signal includes assigning a value to each selected sensed linguistic variable and said combination of the selected control output membership functions includes scaling each said selected control output membership function by a scaling factor corresponding to the assigned values.

30. A method as recited in claim 29 wherein said combination of the selected control output membership functions includes combining the scaled control output membership functions according to a centroid method.

* * * * *